(12) United States Patent
Pugh et al.

(10) Patent No.: US 8,680,456 B2
(45) Date of Patent: Mar. 25, 2014

(54) METHODS AND APPARATUS FOR DETERMINATION OF PARAMETERS RELATED TO THE MOVEMENT OF A COILED TUBING STRING

(75) Inventors: Trevor K. Pugh, Tomball, TX (US); Patrick A. Kelleher, Conroe, TX (US)

(73) Assignee: National Oilwell Varco, L.P., Houston, TX (US)

( * ) Notice: Subject to any disclaimer, the term of this patent is extended or adjusted under 35 U.S.C. 154(b) by 209 days.

(21) Appl. No.: 13/383,426

(22) PCT Filed: Aug. 10, 2010

(86) PCT No.: PCT/US2010/045015
§ 371 (c)(1),
(2), (4) Date: Jan. 11, 2012

(87) PCT Pub. No.: WO2011/019714
PCT Pub. Date: Feb. 17, 2011

(65) Prior Publication Data
US 2012/0126151 A1    May 24, 2012

Related U.S. Application Data

(60) Provisional application No. 61/232,473, filed on Aug. 10, 2009.

(51) Int. Cl.
*H01J 40/14*     (2006.01)
(52) U.S. Cl.
USPC ..................................... 250/221; 250/559.26

(58) Field of Classification Search
USPC ............ 250/221, 559.26, 214.1, 239; 356/28, 356/72, 73, 496–498
See application file for complete search history.

(56) References Cited

U.S. PATENT DOCUMENTS

| 4,958,929 A | 9/1990 | Kondo |
| 6,563,129 B1 | 5/2003 | Knobel |
| 7,535,580 B2 * | 5/2009 | Matsuoka ...................... 356/498 |
| 2004/0233459 A1 | 11/2004 | Booth |
| 2010/0097450 A1 | 4/2010 | Pugh et al. |

FOREIGN PATENT DOCUMENTS

WO    2007026111 A1    3/2007

OTHER PUBLICATIONS

STMicroelectronics, "VT5376, Ultra-Low Power Motion Sensor for Optical Finger Navigation and Laser Mice," Doc IDS 13939 Rev 4, 31 pages, 2010.
International Application No. PCT/US2010/045015, "PCT International Search Report Dated Apr. 22, 2010," 9 pages.

* cited by examiner

*Primary Examiner* — Que T Le
(74) *Attorney, Agent, or Firm* — Conley Rose, P.C.

(57) ABSTRACT

Systems and techniques for non-contact measurement of coiled tubing motion are disclosed. In one embodiment, a system includes a laser source and a laser motion sensor. The laser source is configured to provide laser light that illuminates the coiled tubing as the tubing moves. The laser motion sensor is configured to collect and process laser speckle images and compute measurements of coiled tubing movement based on the laser speckle images.

26 Claims, 6 Drawing Sheets

METHODS AND APPARATUS FOR DETERMINATION OF PARAMETERS RELATED TO THE MOVEMENT OF A COILED TUBING STRING

CROSS-REFERENCE TO RELATED APPLICATIONS

This application is a non-provisional application claiming priority to provisional application Ser. No. 61/232,473, filed on Aug. 10, 2009, entitled "Methods and Apparatus for Calculation of Distance Traveled, Velocity and Acceleration of Coiled Tubing String," the entire disclosure of which is incorporated by reference herein.

FIELD OF INVENTION

The present invention relates to depth measurement of coiled tubing as it is used in the oil and gas industry and, more particularly to a non-contacting depth measurement techniques. The techniques are also applicable to depth, velocity and acceleration measurement on any tubing that is in motion along its axis.

BACKGROUND

There are many methods used to measure the depth of equipment within oil and gas wells. These usually consist of devices that are in physical contact with the conducting mechanism that transports the equipment to and from the surface through the wellbore.

In particular, when a coiled tubing operation is in progress, the prevailing method of depth measurement relies on one or more rotating measurement wheels that are in contact with the external surface of the coiled tubing. The measurement wheels are typically connected to quadrature encoders. The quadrature encoders produce a series of pulses as the measurement wheels rotate in concert with the linear motion of the coiled tubing as it passes by the measurement wheel. At any particular measurement wheel, the number of pulses is proportional to the length of tubing that has passed by the rotating measurement wheel. Those skilled in the art of coiled tubing operations will understand the normal process of feeding tubing into a wellbore.

Conventional depth measurement systems suffer accuracy and repeatability problems that manifest themselves as an inability to correctly record the depth of the leading end of the coiled tubing in the wellbore. Repeatability problems are often caused by an undetermined amount of slip that can vary as a result of changing conditions during the coiled tubing operation (e.g., ice on the coiled tubing, etc.). Slip results when tubing passes the measurement wheels without an equivalent rotation of the measurement wheels being recorded.

Further, repeatability errors may also arise due to the inability of existing depth measurement systems to measure the amount of stretch in the coiled tubing. Stretch is caused by the weight of the equipment attached to the tubing and the weight of the deployed tubing. The amount of tubing stretch also depends on other factors such as downhole friction and wellbore deviation.

Accuracy is dependent on factors such as the diameter of the measurement wheels being known to a specified tolerance. Measurement wheels are often prone to collecting dirt and grease which can result in a change in diameter. Although the diameter change may be small, over 10,000 feet of coiled tubing, the cumulative error in measurement due to a small change in diameter can be significant and undetected. Over a prolonged period of use, the surface of the measurement wheel begins to wear as a result of the rotating contact with the coiled tubing. This surface wear results in a decreased diameter of the rotating measuring wheel, which adds to depth measurement errors. There remains a need for improved measurement systems and methods.

SUMMARY

The present disclosure is directed to systems and methods for determining parameters related to coiled tubing, such as the displacement, velocity, and/or acceleration of the coiled tubing. The disclosed techniques are an effort to overcome certain problems encountered with conventional systems. In embodiments of the invention, the sensor does not contact the coiled tubing being measured. The small size of the disclosed system allows for advantageous positioning of equipment. Some embodiments of the invention include a unique use of laser motion sensors, as exemplified by laser mouse sensors, which combine several disparate aspects of the disclosed system into one component.

In hydrocarbon and water well operations, coiled tubing is typically provided on a drum which is rotated to pay out the tubing through a level wind. The coiled tubing passes over a plurality of sheaves included in a support arch, used to change the direction of the tubing motion to the vertical plane. Made vertical, the coiled tubing is ready for insertion in to a wellbore tubing that runs co-incident with, and is contained within the wellbore. At least a portion of the disclosed non-contacting depth measurement system may be mounted at the level wind or near the point of insertion of the coiled tubing into the wellbore tubing.

Some embodiments of the non-contacting depth measurement system comprise: a) a digital signal processor image controller, with a laser drive circuit for illumination of the tubing to produce a laser speckled image, with an optical sensing system for collecting and processing laser speckle images and calculating measurements; b) digital imaging electronics conductively coupled to the digital signal processor image controller through a high speed data link, for transferring digital image data; c) a cleaning mechanism for keeping the image system components free from obstructions; and d) a user interface unit conductively coupled to the digital signal processing image controller, for display of the calculated data and user input.

Embodiments of the present disclosure include novel implementations of laser speckling motion detection for use with coiled tubing. Disclosed embodiments are significantly different from systems and methods applicable to other industries, and include, for example: a) a sensor remaining stationary while the coiled tubing is constantly moving past the sensor; b) longer focal lengths of the sensor lens; c) the use of powerful laser lights; d) means for mitigating the effects of surface quality changes over time; e) means for mitigating the effects of coiled tubing icing that can result in no signal being detected; f) means for mitigating occlusion of the optical path of the laser light by debris from the coiled tubing; and g) intrinsically safe operation that may require remote location of the sensor head.

In some embodiments of the present invention, the laser emitter, image sensor, and digital signal processor can be implemented using a laser motion sensor of sufficient capabilities, such as the ST Micro VT 5376.

Other embodiments of the invention can be implemented to use an air knife to ensure that the image and laser light paths are kept clean and free of moisture and debris that are typical in the oilfield operating environment.

In other embodiments, the laser motion sensor is optically coupled to an optical fiber cable bundle and a matched laser light source is optically coupled to second optical fiber cable bundle. The lower number of pixels in a typical optical fiber cable bundle is complimentary to the lower number of pixels found in the laser motion sensor. In one embodiment, the optical fiber cable bundle will have at least double the number of fibers in the cable as there are pixels in the laser motion sensor. Another embodiment allows a digital camera and light source to be mounted away from the sensor head. The sensor head can be mounted at either the level wind or near the wellhead insertion point and consists of only the fiber bundles, cleaning system, and reference and supporting structures.

In embodiments of the invention, a determination of the distance moved by the object in the image should occur often enough to ensure that the object in the image does not move beyond the image frame boundaries. In some embodiments, the instantaneous velocity and displacement will be available.

Certain embodiments of the invention can also be implemented with a controller and user interface replaced by a sufficiently powerful commercial computer.

Certain embodiments of the present invention include remote non-contacting measurement of the motion of coiled tubing as it is used in hydrocarbon and water well operations, with the desired goal of improving accuracy and long-term reliability. Other features and characteristics of embodiments of the invention will be apparent from a review of the following detailed description.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct physical and/or electrical connection. Thus, if a first device couples to a second device, that connection may be through a direct physical and/or electrical connection, or through an indirect physical and/or electrical connection via other devices, components, and connections.

DETAILED DESCRIPTION

The following discussion is directed to various embodiments of the invention. Although one or more of these embodiments may presently be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and is not intended to intimate that the scope of the disclosure, including the claims, is limited to that embodiment.

Determining distance of travel into a wellbore is important to ensure that desired operations are performed at the proper location. For example, a perforation operation to be performed at a given depth may not achieve the desired effect if performed at a different depth. Mechanisms for determining the length of coiled tubing inserted into a borehole that rely on contact with the tubing may be subject to inaccuracy due to slippage or changes in the contact apparatus. Embodiments of the present disclosure apply non-contact measurement techniques. More specifically, embodiments apply laser speckling to measure the motion (e.g., displacement, velocity, acceleration) of coiled tubing moving into or out of a borehole.

Figure 1A:
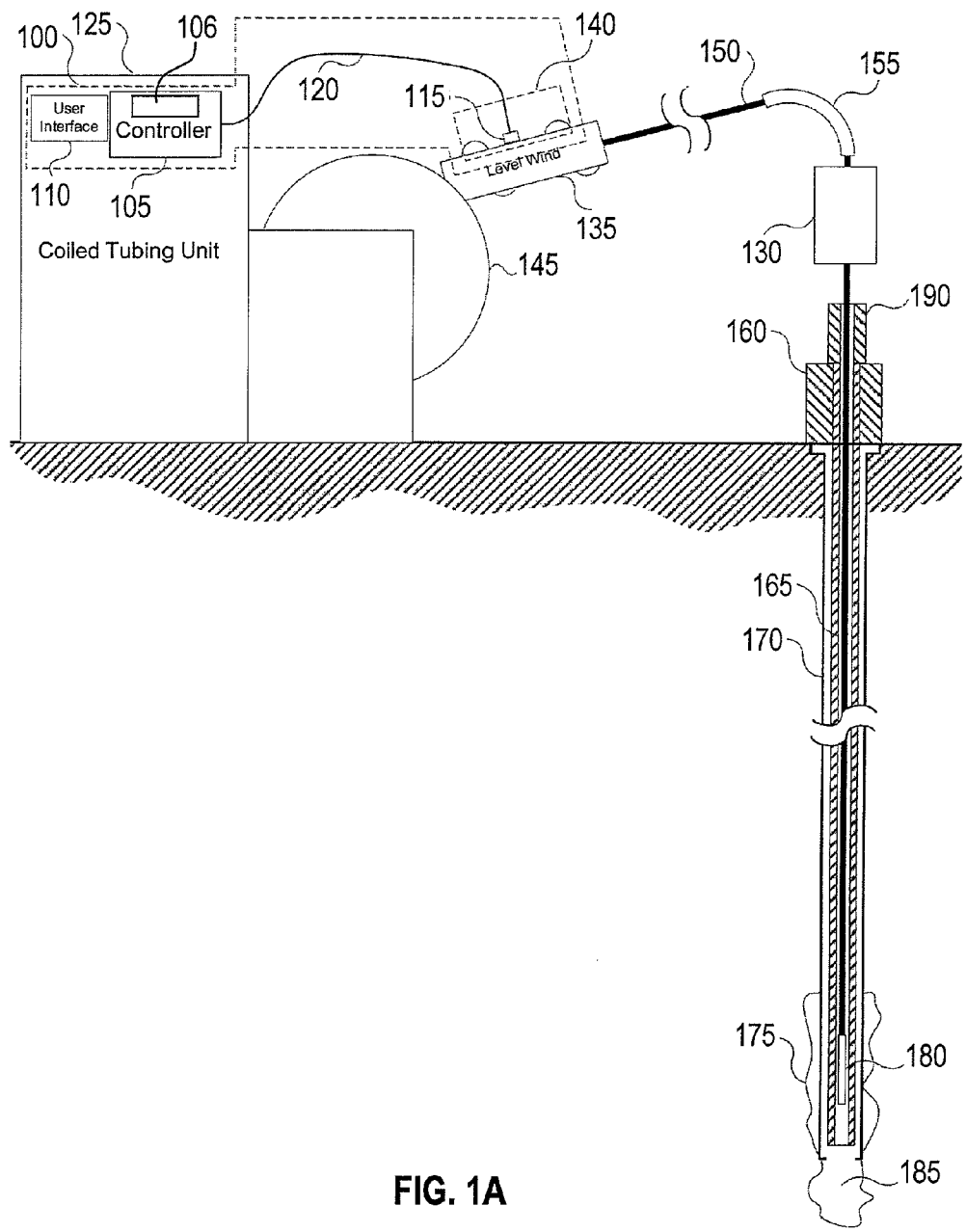
FIG. 1A is a schematic diagram of a measurement system in accordance with certain embodiments of the present invention, illustrated as located in a level wind attached to a coiled tubing unit in the process of inserting tubing into a wellbore.

FIG. 1A is a schematic diagram of a measurement system 100 in accordance with various embodiments of the present invention. The measurement system 100 includes a controller 105, a user interface 110, and a laser motion sensor 115 with its power and communications cable 120. The laser motion sensor 115 is shown mounted at the level wind 135 in the sensor head 140. The level wind 135 is mounted to the coiled tubing reel 145 and coiled tubing 150 passes from the coiled tubing reel 145 through the level wind 135 and past the laser motion sensor 115. According to standard practice, the coiled tubing 150 leaves the tubing reel 145, passes over a plurality of sheaves in a guide arch 155 and is driven by the injector 130 into the wellbore tubing 165, through a stripper 190 and a blow out preventer 160. The wellbore tubing 165 is inside the well casing 170 that is in turn, inside the wellbore 175. The injector 130 provides the driving force to the coiled tubing and can run the coiled tubing in either direction, into the wellbore tubing 165, or out of the wellbore tubing 165 and back on to the coiled tubing reel 145. The coiled tubing 150 can also transport a load 180 into the wellbore tubing 165. The stripper 190 provides a pressure seal between wellbore pressures and ambient air pressure. An open hole 185 is shown below the well casing 170.

Although not necessary to implement embodiments of the invention, examples of the tubing support arch 155, cable injector 130, coiled tubing unit 125 and the stripper 190, are shown in the coiled tubing units MKT10T or MK20T manufactured by Hydra Rig, a National Oilwell Varco company.

In some embodiments of the system 100, the laser motion sensor 115 is a sub-system configured to acquire laser speckle images and measure the motion of the coiled tubing 150 based the acquired laser speckle images. Motion measurement values may then be transferred, via the cable 120, from the laser motion sensor 115 to the controller 105 for further processing, storage, and/or display. Some such embodiments employ the ST MICRO VT 5376, made by ST Microelectronics located in Geneva, Switzerland as the laser motion sensor 115. Similar suitable laser motion sensors known in the art may be used in embodiments of the system 100.

In some embodiments of the system 100, the laser motion sensor 115 is configured to acquire digital image data representing a laser speckle image and transfer the image data to the controller 105 via the cable 120. The controller 105 may include a digital signal processor 106 configured (e.g., via instructions read from a program storage device) to process the image data with reference to previously received laser speckle images and to measure the movement of the coiled tubing based identification of similarities in the different laser speckle images.

Embodiments of the system 100 measuring movement of the coiled tubing 150 via operation of the digital signal processor 106 may employ one or more motion detection algorithms. For example, embodiments may measure coiled tubing displacement between successive laser speckle images using a cross-correlation of statistical factors algorithm, a two-dimensional cross-correlation algorithm, and/or a two-dimensional Fast Fourier transform algorithm in conjunction with a Hough transform loop.

In an exemplary cross-correlation of statistical factors algorithm, a new image is acquired by the laser motion sensor 115 and passed to the controller 105 in the form of an image matrix. The signal processor 106 may high-pass filter the image using a spatial filter. In some embodiments, the spatial filter is a gradient filter with a kernel matrix arranged to emphasize image artifacts in the direction of motion of the coiled tubing 150. The size or dimension of the kernel matrix can be used to trade off accuracy of result with speed of calculation. A kernel definition for a gradient filter is given below:

| a | b | c |
|---|---|---|
| b | x | -d |
| c | d | -a |

This kernel can have the required axis of symmetry if the values are given as below:

| 0 | 1 | 1 |
|---|---|---|
| -1 | 0 | 1 |
| -1 | -1 | 0 |

This filter is sensitive to variations of intensity perpendicular to the axis of symmetry.

The digital signal processor 106 generates statistical factors from the high-pass filtered image data. The statistical average, variance and kurtosis are generated from data in the image matrix that are orthogonal (columns) to the direction of motion of the coiled tubing 150. In this manner, the data are reduced to a single dimension array of data that emphasizes high contrast elements within the image matrix. In addition, in this way a data array is generated that has distinctive structure but with much reduced data size and is thus a speed enhancement for the algorithm. Kurtosis is a known statistical method used to indicate data that contains peaks that are infrequent and with extreme deviations. The resultant data array is stored in memory accessible by digital signal processor 106.

If the digital signal processor 106 identifies (i.e., has stored in memory) kurtosis data for a previous image, then the digital signal processor 106 performs a cross-correlation (sometimes known as "cross-covariance") on the two kurtosis data arrays.

The digital signal processor 106 applies peak detection (e.g., a smoothed second derivative peak detection algorithm) to the result of the cross-correlation to determine the displacement of the coiled tubing 150 across the two images from which the kurtoses were derived. The identified peak is proportional to the displacement of the coiled tubing 150 that occurred between the two images. The peak detection algorithm may produce a result that has sub-pixel resolution and accuracy better than 0.0003%. The sub-pixel resolution is achieved because the algorithm produces fitted data about the maximized peak.

In an exemplary two-dimensional cross-correlation algorithm, a new image is acquired and high-pass filtered as described above with regard to the cross-correlation of statistical factors algorithm. The digital signal processor 106 identifies a region of interest ("ROI") for the correlation. The region of interest may be preexisting or a newly created default. The region of interest is placed over the new image at zero location in the image matrix. The digital signal processor 106 performs a two-dimensional cross-correlation between the region of interest and an identically sized region in the new image. Peak detection is applied to the resultant correlation matrix. The largest peak and its location are stored in memory. If the region of interest is not located at the largest index in the image less an offset of the regions of interest matrix size, then the digital signal processor 106 moves the region of interest to a new location in the new image. The digital signal processor 106 repeats the cross-correlation and peak detection steps until the end of the new image is reached. In some embodiments of the algorithm, cross-correlation starts at the same location in the new image in which the region of interest was found in the previous image, since there is a high likelihood of the maximal peak being found at or near that location.

The digital signal processor 106 searches through each of the peak values recorded and notes the location of the maximal peak recorded. The region in the new image that generated the highest peak is then saved for use with the next image.

In an exemplary two-dimensional Fast Fourier transform algorithm used with a Hough transform loop, a new image is acquired by the laser motion sensor 115 and passed to the controller 105 in the form of an image matrix. The new image is low-pass filtered (e.g., using a linear spatial filter).

The digital signal processor 106 generates a region of interest based on the output of the low-pass filter. The digital signal processor 106 processes the region of interest using a two dimensional Fast Fourier transform. The resultant complex matrix data is converted to phase angle magnitude data in the frequency domain as:

$$\phi(\omega_x + \omega_y) = \tan^{-1} \frac{B(\omega_x, \omega_y)}{A(\omega_x, \omega_y)} \quad (1)$$

where:

$B(\omega_x, \omega_y)$ is the imaginary part of the Fourier matrix;

$A(\omega_x, \omega_y)$ is the real part of the Fourier matrix;

$$\omega_x = \frac{2\pi}{N}; \text{ and}$$

$$\omega_y = \frac{2\pi}{M}.$$

M and N are respectively the number of rows and columns in the Fourier matrix, and a reference to x or y is respectively a reference to a column or row of a matrix of data.

The digital signal processor 106 collects two sets of phase angle data created from two sequential images. The real value phase angle matrix from the first image is subtracted from the phase angle matrix of the second image as:

$$\Phi(\omega_x, \omega_y) = \Phi_t(\omega_x, \omega_y) - \Phi_{t+\delta t}(\omega_x, \omega_y) \quad (2)$$

The result of the subtraction is passed to a Hough Transform loop. The following two equations are used to allow the Hough Transform to resolve image velocity and thus displacement.

$$v_y = \frac{1}{\omega_y \delta t}(\phi_{\delta t}(\omega_x, \omega_y) - \omega_x v_x \delta t), \text{ and} \quad (3)$$

$$v_x = \frac{1}{\omega_y \delta t}(\phi_{\delta t}(\omega_x, \omega_y)) \quad (3.1)$$

The digital signal processor 106 can apply a second order differential peak detection algorithm to resolve the highest peak in the Hough Transform array. The location of this peak within the array provides a velocity vector for the two time separated images. Velocity, rather than distance, is a direct result, of this algorithm. There are many more data points per second than the other algorithms, so small changes in velocity are apparent. The velocity can be expressed as a vector, so any effects relating to motion of coiled tubing perpendicular to its expected motion are known immediately.

Figure 1B:
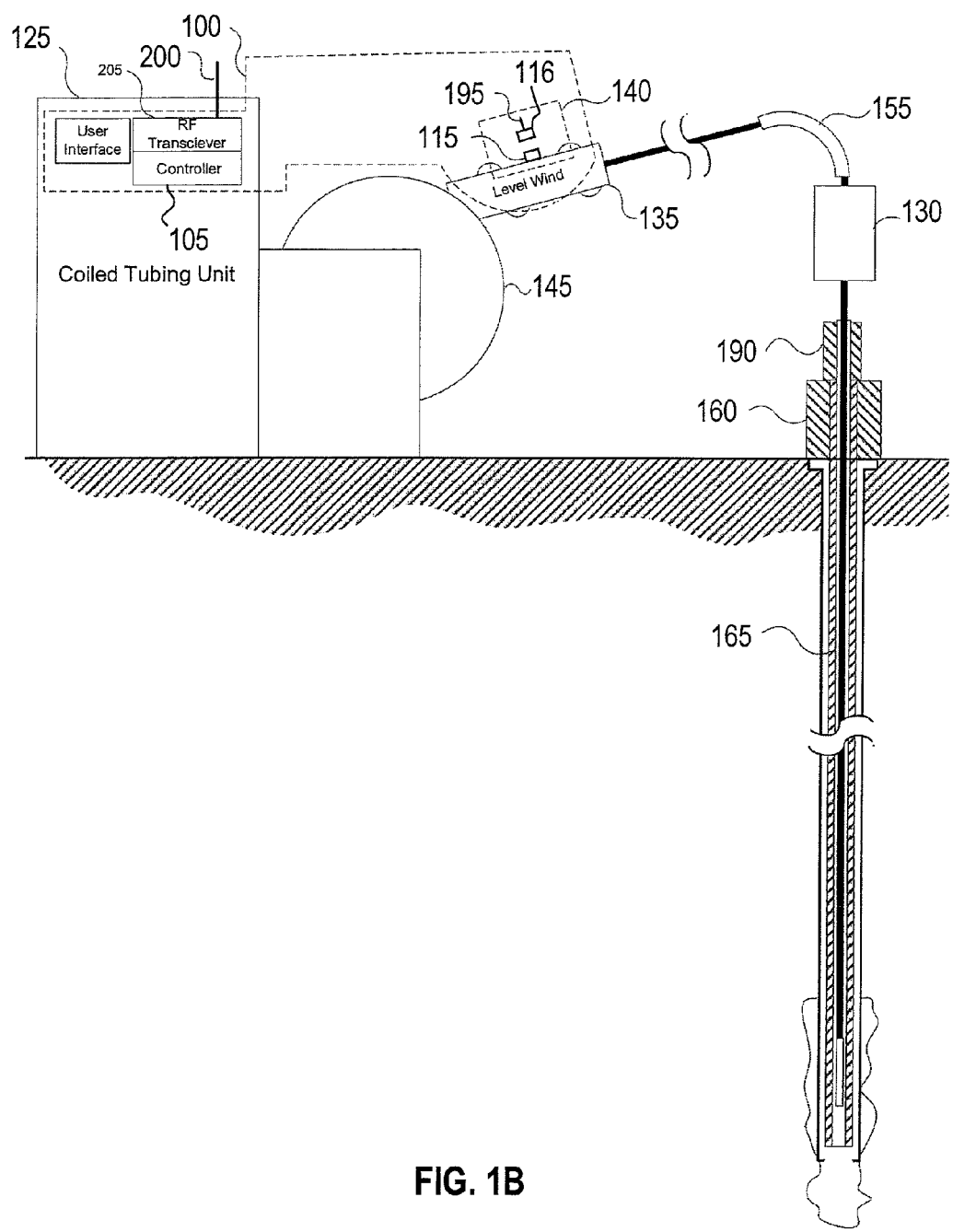
FIG. 1B is a schematic diagram of a measurement system in accordance with certain embodiments of the present invention, illustrated as located in a level wind using a spread spectrum radio frequency link to the coiled tubing unit.

FIG. 1B shows another embodiment of a non-contacting measurement system 100, showing the laser motion sensor 115 and an RF spread spectrum transceiver 116 with antenna 195 in the sensor head 140, mounted on the level wind 135. A second RF spread spectrum transceiver 205 and antenna 200 are mounted in the coiled tubing unit 125. The laser motion sensor 115 acquires laser speckle images reflected from the coiled tubing 150, and measures motion of the coiled tubing 150 based on the acquired images. Measurement values are transferred from the laser motion sensor 115 to the controller 105 via the RF transceivers 116, 205.

Figure 1C:
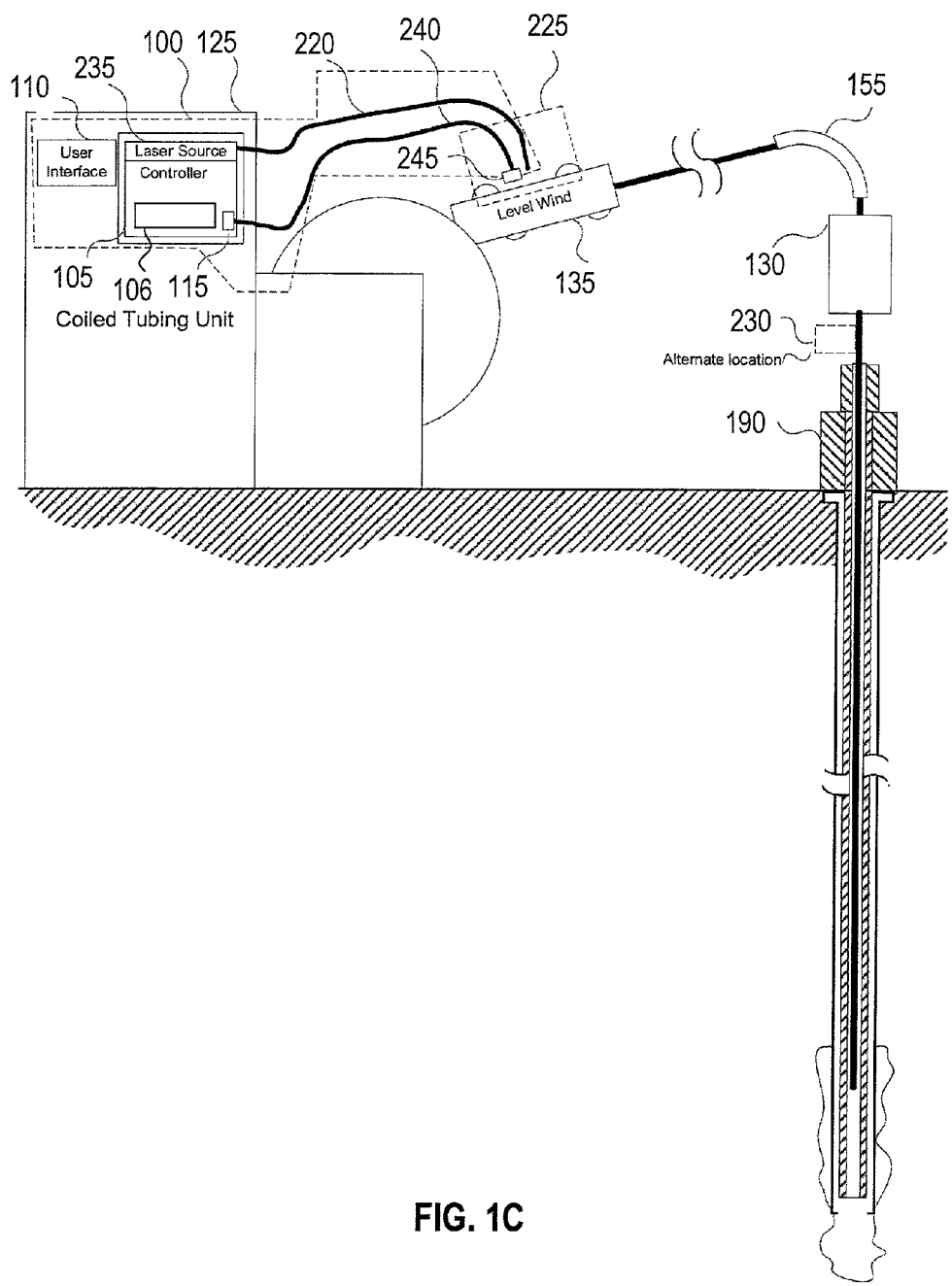
FIG. 1C is a schematic diagram of a measurement system in accordance with certain embodiments of the present invention, illustrating an electronics package and laser source being located in a coiled tubing unit and connected to fiber optical cable bundles connected to a simplified detection head located at the level wind.

FIG. 1C shows another embodiment of a non-contact measurement system 100. In this arrangement a laser source 235 and laser motion sensor 115 are collocated with the controller 105 in the coiled tubing unit 125. A single mode fiber optic cable 220 is optically coupled to the laser source 235 in the non-contact depth measurement sensor head 225. A wound fiber optic bundle cable 240 is optically coupled to the laser motion sensor 115 through a fused fiber optical tapper 245.

As explained above, in some embodiments of the system 100, the laser motion sensor 115 is configured to acquire laser speckle images and measure the motion of the coiled tubing 150 based the acquired laser speckle images. In other embodiments of the system 100, the laser motion sensor 115 is configured to acquire digital image data representing a laser speckle image and transfer the image data to the controller 105. The digital signal processor 106 may be configured to process the image data with reference to previously received laser speckle images and to measure the movement of the coiled tubing based on the image data using, for example, the algorithms explained above.

The arrangement of FIG. 1C reduces safety risks created by positioning electrical components within a hazardous atmosphere by removing at least some electrical components from the sensor head 225. Thus, the sensor head 225 may be intrinsically safe and consequently may be positioned at the alternate location 230, between the injector 130 and the stripper 190, a location where hydrocarbons and thus flammable gases may be present. This location is advantageous as it removes errors in measurements that might otherwise be caused by the coiled tubing 150 not following the tubing guide arch 155.

The wound fiber optic bundle cable 240 is exemplified by the Schott IG-163 and the fused optical tapper 245 is exemplified by the fused optical tapers made by Schott Inc. located in Southbridge, Mass.

Figure 2A:
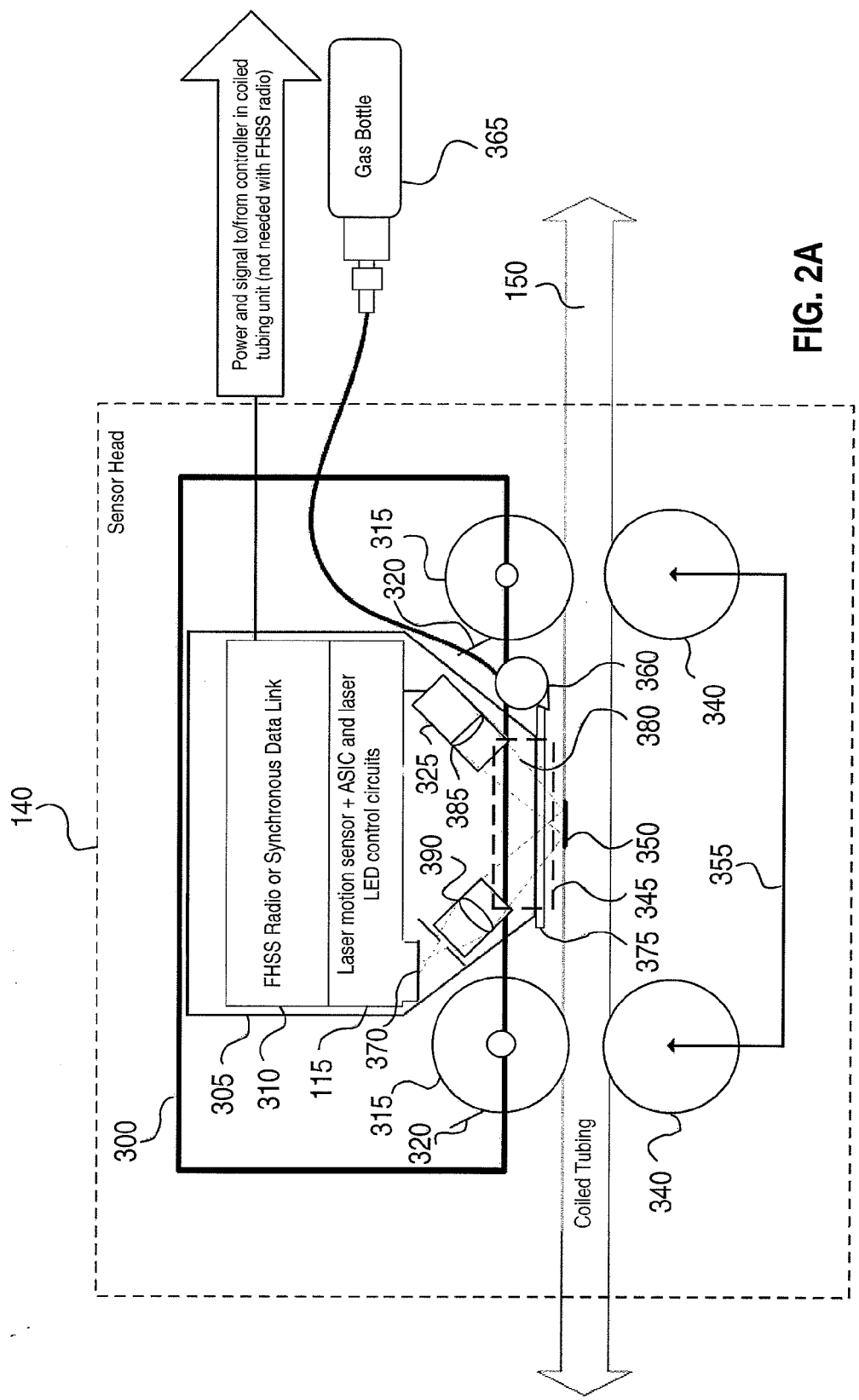
FIG. 2A is a schematic diagram of a sensor head utilized with a measurement system in accordance with certain embodiments of the present invention.

FIG. 2A shows an embodiment of the sensor head 140. The sensor head 140 includes electronic assemblies 310 and 115, and an optical system assembly 325 housed within a protective housing 305 that includes a removable, optically matched protective glass plate 375. The electronic assembly 310 is a transceiver configured for optical, wired, or wireless communication of image and other data between the sensor head 140 and the controller 105. The electronic assembly 115 is a laser motion sensor as discussed above with regard to FIG. 1A.

The sensor head 140 includes several devices for maintaining a clean and clear image of the coiled tubing 150. A roll off film canister 345 includes a clear film that passes in front of the image plane and is rolled from a first canister to a second canister. In this manner, dirt can be periodically removed from the image path by advancing the film. An air knife system 360 and 365 (e.g., a 2.5" air knife by Air Blast Inc. of Alhambra, Calif.) is configured to prevent dust, grease and other debris from impinging on the protective glass plate 375. In addition, there is a plurality of wheel scrappers 320.

The protective housing 305, containing the electronic assemblies 310, 115, and the guide wheels 315 are referenced to the structure frame 300. Thus ensuring that a known distance is maintained between the object plane 350 on the coiled tubing 150 and the image plane 370 on the laser motion sensor 115 and its associated image sensor (e.g., charge coupled device, CMOS image sensor, etc.). The sensor head 140 is held to the coiled tubing 150 by a pinch roller mechanism 355 for applying force to a plurality of pinch rollers 340. The image plane 370 and the image sensor of the laser motion sensor 115 are coincident.

The image path 380 originates at the laser light source 325 that is collimated by the lens 385 and subsequently passes through the protective glass plane 375 to the coiled tubing object plane 350 where the laser light is reflected in the form of a speckled image, caused by the random crystalline structure at the exterior surface of the coiled tubing 150. The reflected image passes back through the protective glass plane 375 into the objective lens assembly 390, and passes from the lens assembly 390 to the laser motion sensor 115.

The air knife system 360 includes an external gas supply 365. The external gas supply 365 may also be a regulated dry air source. The air knife 360 is used to keep debris from impinging on the image path 380. The roll off canister 345 is removable for easy servicing and has a typical application within auto racing cinematography.

Figure 2B:
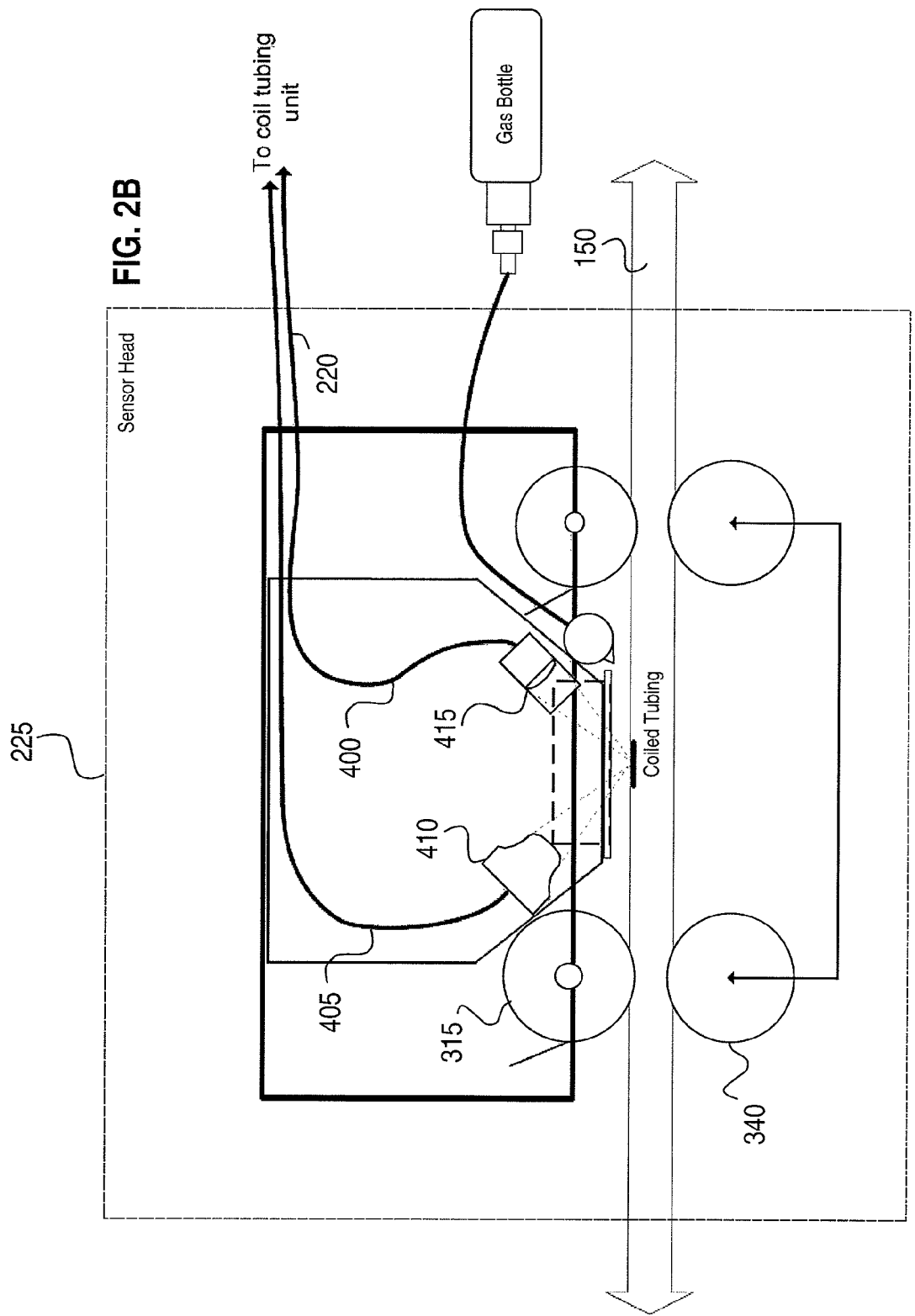
FIG. 2B is a schematic diagram showing the effect of moving an electronics assembly and laser light source to a location remote of the sensor head in accordance with certain embodiments of the present invention.

FIG. 2B shows the effect of moving the electronics assembly (e.g., the laser motion sensor 115, data link electronics, FIG. 2A) and laser light source (325, FIG. 2A) to a location remote of the sensor head. Embodiments of the sensor head 225 may be smaller and simpler relative to the sensor head 140, and can be Zone 1 (e.g., National Electrical Code Class I, Division 1) approved for hazardous areas, allowing for advantageous location between the injector 130 and the stripper 190. The pinch wheels 340 and guide wheels 315 are still present. The optical system comprises a single clad fiber 400 for carrying the laser light from the laser source 235 in the coiled tubing unit 125 that is optically coupled to the collimating lens 415. The laser light is reflected off the surface of the coil tubing 150 as a speckled image and is received by the fused fiber optic tapper 410 that is optically coupled to the optical fiber cable bundle 405. The speckled image is conducted through the fiber bundle 405 to the laser motion sensor 115 in the controller 105.

It will be appreciated by those skilled in the art that the systems/techniques disclosed herein can be fully automated/autonomous via software configured with algorithms to perform operations as described herein. These aspects can be implemented by programming one or more suitable processors, for example, general-purpose processors, digital signal processors, etc. Such processors may be incorporated in general-purpose or specific-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial.

Figure 3:
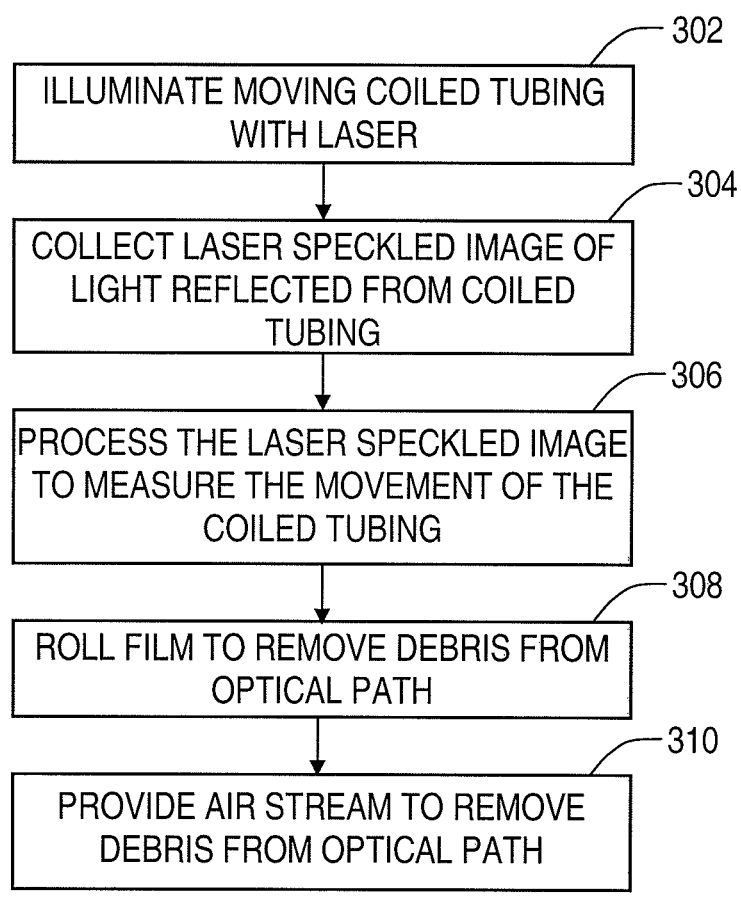
FIG. 3 shows a flow diagram for a method for performing measurement in accordance with various embodiments disclosed herein.

FIG. 3 shows a flow diagram for a method for performing depth measurement in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as or controlled by instructions stored in a computer readable storage medium and executed by one or more processors (e.g., digital signal processor 106).

In block 302, the laser light source 325, 235 is generating laser light that illuminates the moving coiled tubing 150. The laser light may be generated in close proximity to the coiled tubing 150 (e.g., laser source 325 in the sensor head 140), or at a remote location (e.g., laser source 235 in the coiled tubing unit 125) and transmitted to the sensor head 225 via the optical fiber 220.

In block 304, the laser light is reflected by the coiled tubing 150. An image sensor collects the reflected laser light as a laser speckle image. The reflected laser light may routed to a remote image sensor (e.g., laser motion sensor 115, FIG. 1C) via a fiber optic bundle 240, or routed to an image sensor 115 local to the sensor head 140.

In block 306, the laser speckle image is processed to measure motion attributes (e.g., displacement, velocity, acceleration) of the coiled tubing 150. In some embodiments, the processing is performed in the laser image sensor 115, which provides a measurement value indicative of coiled tubing movement. Alternatively, the processing may be performed by a processor 106 in the controller 105 executing a motion determination algorithm such as those described herein. Values indicative of coiled tubing motion may be stored in the controller 105 and/or displayed by the controller 105 on the user interface 110.

In block 308, a film disposed in the sensor head 140 is advanced between a pair of film canisters. The film separates the coiled tubing 150 from the optical elements, such as glass plate 375, of the sensor head 140. Moving the film from a first to a second canister removes debris accumulated on the film from the optical path.

In block 310, an air stream is provided across the optical path between the coiled tubing 150 and the glass plate 375. The air stream is generated by the air knife 360 located in the sensor head 140. The air stream removes debris from the optical path.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for measuring movement of coiled tubing, comprising:
a laser source configured to provide laser light that illuminates the coiled tubing as the tubing moves; and
a laser motion sensor configured to collect and process laser speckle images and compute measurements of length of coiled tubing disposed in a borehole based on the laser speckle images.

2. The system of claim 1, further comprising a sensor head disposed to direct the laser light onto the coiled tubing, and to gather laser light reflected by the coiled tubing.

3. The system of claim 2, wherein at least one of the laser source and the laser motion sensor are disposed within the sensor head.

4. The system of claim 2, wherein at least one of the laser source and the laser motion sensor are disposed remotely from the sensor head.

5. The system of claim 2, wherein the sensor head is disposed in a level wind attached to a coiled tubing unit.

6. The system of claim 2, wherein the sensor head is disposed between an injector and a stripper near a well head insertion point.

7. The system of claim 1, further comprising an optical fiber cable optically coupled to the laser source, the cable disposed to conduct the laser light from the laser source to a sensor head.

8. The system of claim 1, further comprising an optical fiber bundle optically coupled to the laser motion sensor, the fiber bundle disposed to conduct the laser speckle images from a sensor head to the laser motion sensor.

9. The system of claim 1, further comprising a radio frequency transceiver configured to communicate measurements of coiled tubing motion from the laser motion sensor to a controller disposed in a coiled tubing unit.

10. The system of claim 1, further comprising a transparent film configured to roll from a first canister to a second canister, the film disposed between an object plane on the coiled tubing and the laser motion sensor.

11. The system of claim 1, further comprising an air knife configured to prevent accumulation of debris on a glass plate disposed between an object plane on the coiled tubing and the laser motion sensor.

12. The system of claim 1, further comprising a plurality of pinch rollers that hold a sensor head to the coiled tubing.

13. A method for measuring movement of coiled tubing, comprising:
- illuminating coiled tubing with laser light as the coiled tubing moves;
- collecting a laser speckle image of the laser light reflected from the coiled tubing; and
- processing the laser speckled image to measure the movement of the coiled tubing over a length of coiled tubing disposed in a borehole.

14. The method of claim 13, further comprising transmitting the laser light from a laser source to a remote sensor head that illuminates the coiled tubing.

15. The method of claim 13, further comprising transmitting laser light reflected from the coiled tubing at a remote sensor head to a laser motion sensor remote from the sensor head.

16. The method of claim 13, further comprising transmitting a value indicative of a measurement of coiled tubing motion from a sensor head to a controller configured to record the measurement.

17. The method of claim 13, further comprising removing debris from an optical path of the laser light by rolling, from a first canister to a second canister, a film disposed between an object plane on the coiled tubing and a collimating lens in a sensor head.

18. The method of claim 13, further comprising providing a stream of air between the coiled tubing and a glass plate disposed between the coiled tubing and an objective lens assembly, wherein the stream of air prevents debris from collecting in an image path of a sensor head.

19. A system for measuring motion of coiled tubing, comprising:
- a laser source configured to provide laser light that illuminates the coiled tubing as the tubing moves;
- an optical sensor configured to collect laser speckle images reflected from the coiled tubing; and
- a signal processor image controller configured to generate a motion measurement value indicative of displacement of coiled tubing in a borehole based on the laser speckle images.

20. The system of claim 19, further comprising a user interface unit configured to display the motion measurement value.

21. The system of claim 19, wherein the signal processor image controller determines displacement between successive laser speckle images using one of a cross-correlation of statistical factors algorithm, a two-dimensional cross-correlation algorithm, and a two-dimensional Fast Fourier transform algorithm with a Hough transform loop.

22. The system of claim 19, further comprising a sensor head including a first lens assembly configured to direct laser light onto the coiled tubing and a second lens assembly configured to collect laser light reflected from the coiled tubing.

23. The system of claim 22, wherein the sensor head comprises at least one of the laser source and the optical sensor.

24. The system of claim 22, wherein at least one of the laser source and the optical sensor are coupled to the sensor head via an optical fiber disposed to couple the sensor head to the signal processor image controller.

25. The system of claim 22, wherein the sensor head is disposed at one of a level wind attached to a coiled tubing unit and an injector.

26. The system of claim 19, further comprising a cleaning system configured to prevent accumulation of debris in optical paths of a sensor head, the cleaning system comprising at least one of:
- a transparent film disposed between an object plane on the coiled tubing and the laser motion sensor and configured to roll from a first canister to a second canister; and
- an air knife configured to prevent accumulation of debris on a glass plate disposed between an object plane on the coiled tubing and the laser motion sensor.

* * * * *

UNITED STATES PATENT AND TRADEMARK OFFICE
CERTIFICATE OF CORRECTION

PATENT NO.       : 8,680,456 B2               Page 1 of 1
APPLICATION NO. : 13/383426
DATED            : March 25, 2014
INVENTOR(S)      : Pugh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 98 days.

Signed and Sealed this
Twenty-ninth Day of September, 2015

Michelle K. Lee
*Director of the United States Patent and Trademark Office*